US010647527B2

United States Patent
Stark et al.

(10) Patent No.: US 10,647,527 B2
(45) Date of Patent: May 12, 2020

(54) METHOD FOR PNEUMATICALLY CONVEYING PLASTIC PELLETS

(71) Applicant: Coperion GmbH, Stuttgart (DE)

(72) Inventors: Bernhard Stark, Fronreute (DE); Michael Duerr, Wolfegg (DE); Thomas Vögele, Binzwangen (DE); Christian Dikreuter, Immenstaad (DE); Christian Toni, Ravensburg (DE)

(73) Assignee: COPERION GMBH, Stuttgart (DE)

( * ) Notice: Subject to any disclaimer, the term of this patent is extended or adjusted under 35 U.S.C. 154(b) by 0 days.

(21) Appl. No.: 15/959,599

(22) Filed: Apr. 23, 2018

(65) Prior Publication Data

US 2018/0305140 A1    Oct. 25, 2018

(30) Foreign Application Priority Data

Apr. 24, 2017   (DE) .................. 10 2017 206 842

(51) Int. Cl.
| | | |
|---|---|---|
| *B65G 53/52* | (2006.01) | |
| *B65G 53/58* | (2006.01) | |
| *B65G 53/10* | (2006.01) | |
| *B65G 53/30* | (2006.01) | |

(52) U.S. Cl.
CPC ........... *B65G 53/526* (2013.01); *B65G 53/10* (2013.01); *B65G 53/30* (2013.01); *B65G 53/58* (2013.01)

(58) Field of Classification Search
CPC ............................. B65G 53/526; B65G 53/10
USPC .................... 406/47, 48, 151, 197
See application file for complete search history.

(56) References Cited

U.S. PATENT DOCUMENTS

| | | | |
|---|---|---|---|
| 2,350,759 A | 6/1944 | Hilmer et al. | |
| 5,156,498 A | 10/1992 | Nomura et al. | |
| 5,591,152 A | 1/1997 | Buell et al. | |
| 8,410,223 B2 * | 4/2013 | Matsumoto | C08J 3/12 524/556 |

(Continued)

FOREIGN PATENT DOCUMENTS

| | | |
|---|---|---|
| DE | 41 11 056 A1 | 10/1991 |
| DE | 295 15 940 U1 | 12/1995 |

(Continued)

OTHER PUBLICATIONS

Coperion: "APP seminar Advanced Material Handling Solutions", 8. Jan. 2015 (Jan. 8, 2015), XP055641394, Gefunden im Internet: URL:http://www.coperionktron.com.es/News/Seminars/Plastics/Barcelona/CK.cfm [gefunden am Nov. 12, 2019].

Siegel, Wolfgang: "4.1.3 Grundlagen der Berechnung von pneumatischen Förderanlagen" in: "Pneumatische Förderung Grundlage, Auslegung, Anlagenbau, Betrieb", Jan. 1, 1991 (Jan. 1, 1991), Vogel Buchverlag, XP055618364, Seite 2pp, 8, 83-85, 92.

(Continued)

*Primary Examiner* — Joseph A Dillon, Jr.
(74) *Attorney, Agent, or Firm* — McGlew and Tuttle, P.C.

(57) ABSTRACT

When performing a method for pneumatically conveying plastic pellets, the plastic pellets are conveyed, by means of a carrier gas, through a conveyor line from a feed point to a destination with a liquid being added thereto, wherein the quantity of liquid added to the plastic pellets and/or the carrier gas is such that during conveying, the carrier gas is oversaturated with the liquid at least in sections of the conveyor line in such a way that a Froude number defining the conveying conditions in the conveyor line is smaller than 45 at any point along the conveyor line.

16 Claims, 3 Drawing Sheets

(56) References Cited

U.S. PATENT DOCUMENTS

| | | | |
|---|---|---|---|
| 8,591,152 B2 * | 11/2013 | Funk | C08J 3/12 406/197 |
| 8,651,773 B2 * | 2/2014 | Funk | B65G 53/66 406/197 |
| 8,742,026 B2 * | 6/2014 | Weismantel | C08J 3/245 525/329.4 |
| 9,096,732 B2 * | 8/2015 | Nogi | C08J 3/12 |
| 9,175,142 B2 * | 11/2015 | Nogi | C08J 3/12 |
| 10,066,064 B2 | 9/2018 | Funk et al. | |
| 2009/0022603 A1 * | 1/2009 | Feise | C08J 3/12 417/55 |
| 2009/0060660 A1 * | 3/2009 | Funk | B65G 53/66 406/197 |
| 2009/0060661 A1 * | 3/2009 | Feise | B65G 53/52 406/197 |
| 2011/0028670 A1 * | 2/2011 | Matsumoto | C08J 3/12 526/317.1 |
| 2011/0088806 A1 * | 4/2011 | Nogi | C08J 3/12 141/1 |
| 2011/0110730 A1 * | 5/2011 | Nogi | C08J 3/12 406/197 |
| 2012/0231162 A1 * | 9/2012 | Weismantel | C08F 220/06 427/222 |
| 2017/0233552 A1 * | 8/2017 | Roben | C08L 23/06 524/262 |

FOREIGN PATENT DOCUMENTS

| | | |
|---|---|---|
| DE | 198 40 502 C1 | 3/2000 |
| EP | 0 990 606 A2 | 4/2000 |
| EP | 2 159 526 A2 | 3/2010 |
| JP | 2010 202792 A | 9/2010 |
| WO | 2007/104676 A1 | 9/2007 |
| WO | 2011/042429 A1 | 4/2011 |

OTHER PUBLICATIONS

Segler et al.: "Pneumatische Fördersysteme and Beitrag zur Berechnung der Flugförderung", Grundl. Landtechnik, Bd. 29, Nr.1, Jan. 1, 1979 (Jan. 1, 1979), Seiten 13-19, XP055618352.

Skript des Labors für Partikel-Technologie des Instituts für Verfahrenstechnik der ETH Zurich: Hauptseite, Labor für Partikel-Technologie, Instituts für Verfahrenstechnik https://ptl.ethz.ch/ Downloadseite des Skripts: https://ethz.ch/content/dam/ethz/ special- interest/mavt/process-engineering/particle-technology-laboratory-dam/documents/lectures/micro-nano/script/Script_German. pdf.

Informationsblatt über Weizen des Transport-Informations-Service der Gesamtverbandes der Deutschen Versicherer (TIS-GDV). Hauptseite des TIS-GDV: www.tis.gdv.de Download Infoblatt: http://www.tis-gdv.de/tis/ware/getreide/weizen/weizen.htm.

* cited by examiner

METHOD FOR PNEUMATICALLY CONVEYING PLASTIC PELLETS

CROSS-REFERENCE TO RELATED APPLICATIONS

This application claims the priority of German Patent Application, Serial No. DE 10 2017 206 842.6, filed on Apr. 24, 2017, pursuant to 35 U.S.C. 119(a)-(d), the content of which is incorporated herein by reference in its entirety as if fully set forth herein.

FIELD OF THE INVENTION

The invention relates to a method for pneumatically conveying plastic pellets.

BACKGROUND OF THE INVENTION

A method for pneumatically conveying plastic pellets is disclosed in DE 198 40 502 C1.

SUMMARY OF THE INVENTION

An object of the present invention is to improve the conveying behavior of the plastic pellets during pneumatic conveying thereof.

This object is achieved according to the invention by a method for pneumatically conveying plastic pellets which are conveyed, by means of a carrier gas, through a conveyor line from a feed point to a destination with a liquid being added thereto, wherein the quantity of liquid added to the plastic pellets and/or the carrier gas is such that during conveying, the carrier gas is oversaturated with the liquid at least in sections of the conveyor line, wherein a Froude number defining the conveying conditions in the conveyor line is smaller than 45 at any point along the conveyor line.

It was found according to the invention that the conveying behavior of plastic pellets is improved if the Froude number is smaller than 45 at any position along a conveyor line from a feed point to a destination. The Froude number is defined as $$Fr = \frac{v}{\sqrt{D \cdot g}}$$

with v being the superficial velocity of a dry carrier gas in the conveyor line at an operating temperature and an operating pressure, D being the inner diameter of the conveyor line, and g being the acceleration due to gravity. The mass of the dry carrier gas is constant along the conveyor line, in other words it is defined unambiguously. The Froude number may be determined unambiguously for any position along the conveyor line. Surprisingly, it was found that at a Froude number smaller than 45, the product, in other words the plastic pellets, can be conveyed from the feed point to the destination in a reliable and safe manner. Furthermore, at a Froude number smaller than 45, a gentle conveying process is possible that requires less energy. It was found that a conveying process requiring a great amount of energy with high carrier air speeds, in other words with high Froude numbers, is not required although it could be implemented in an uncomplicated manner. An additional reduction of the energy required is obtained at a Froude number smaller than 40, and in particular at a Froude number smaller than 35.

Furthermore, the product is conveyed even more gently. An installation operated according to this method can therefore be made smaller and is less difficult to implement. Also, the investment costs and operating costs of an installation of this type are reduced. The method can be carried out in a particularly economic manner. The plastic pellets to be conveyed pneumatically are fed to the conveyor line at a feed point thereof together with a liquid being added thereto. The quantity of liquid being added to the plastic pellets and/or the carrier gas is sufficient to ensure that the carrier gas to be conveyed is oversaturated with the liquid at least in sections of the conveyor line. This means that the relative humidity of the carrier gas is greater than 100% at least in sections of the conveyor line. The relative humidity is defined as the ratio of the mass of the vapor of the liquid contained in the carrier gas relative to the greatest possible quantity of vapor of this liquid the carrier gas is able to accommodate at the given conditions such as pressure and temperature. At a relative humidity of exactly 100%, the carrier gas is completely saturated with liquid. When even more liquid is added, this causes the carrier gas to be oversaturated. Adding the liquid to the carrier gas can be performed at one or at a plurality of positions of a conveyor installation upstream and/or downstream of the feed point along the conveying direction of the product. The liquid is added in particular by means of a humidifier to humidify the carrier gas and/or the plastic pellets in a targeted manner. The humidifier may be configured in such a way that humid plastic pellets are added to the carrier gas that have a humidity content of up to 0.5%, i.e. 5000 ppm. A liquid supply via a separate liquid connection can therefore be omitted. The humid plastic pellets may be polyolefin pellets, which have not been dried at all or only partly, for example by mechanical drying, after an underwater pelletizing process, for example. The method according to the invention is suitable both for dilute phase conveying and for dense phase conveying of plastic pellets. The plastic pellets have a particle diameter of 2 mm to 5 mm, which is in particular equivalent to that of a sphere having the same volume.

Using water as the liquid simplifies the method even more. In particular, using demineralized water reduces negative effects acting on the method and/or the product.

An incomplete evaporation of the liquid added evaporates only incompletely when being added, wherein in particular the non-evaporated part of the liquid will continue to evaporate when being conveyed along the conveyor line, provides a simplified manner of oversaturating the carrier gas along the conveyor line. In particular, additional humidifiers are not obligatory.

A loading, which is greater than 3, ensures an advantageous product throughput. The loading is defined as the ratio of the product mass flow to the mass flow of the dry carrier gas in the conveyor line. It is particularly advantageous if the loading is greater than 5 and in particular greater than 7.

In the case of an air supply, in other words when using air as carrier gas, the mass flow of the dry carrier gas can be determined by means of a compressed air generator associated to the conveyor system by determining a total humid gas quantity by means of the operating point of the compressed air generator. Alternatively, it is conceivable to perform an air quantity measurement at the intake side or at the discharge side. The total humid gas quantity can then be determined from the pressure and the temperature at the chosen measuring point. The mass flow of the dry gas, in other words the dry air, can then be determined from the liquid content of the gas at intake conditions, in other words from the conditions prevailing at the intake point upstream of the compressed air generator, and from the mass of the dry gas, in other words the dry air.

Alternatively, in the case of a carrier gas supply via a pressure system, the mass flow of the dry carrier gas can be determined and the gas quantity can be set in a manner equivalent to that performed in the case of an air supply via a gas quantity regulating unit, in particular a de Laval nozzle, comprising a pressure regulator, a difference being that the total humid gas quantity is not determined from the operating point of the compressed gas generator but from setting values of the gas quantity regulating unit. Determining the liquid content is in particular not carried out at the intake but in the upstream pressure system or downstream of the gas quantity regulating unit.

The mass flow of the dry carrier gas can be determined from the total volume flow, determined as described above, of the total humid gas quantity by taking into account potential leakages at a rotary valve, for example, in other words they are subtracted to obtain the humid carrier gas flow.

A feed pressure for pneumatically conveying the plastic pellets along the conveyor line ensures a reliable and energy-optimized conveying of the plastic pellets. The feed pressure is equal to a pressure difference between a feed point pressure and a destination pressure. The pressure difference is at least 0.2 bar, in particular at least 0.3 bar, in particular at least 0.4 bar, in particular at least 0.6 bar, and in particular at least 0.8 bar.

A pressure conveying can be implemented in an advantageous and in particular uncomplicated manner. At the feed point, there is an overpressure of at least 0.2 bar gauge (=barg), in particular at least 0.3 barg, in particular at least 0.4 barg, in particular at least 0.6 barg, and in particular at least 0.8 barg. The feed pressure in particular depends on the specific product properties of the plastic pellets, the carrier gas speed, the flow rate and/or the isometry of the conveyor line.

A suction conveying permits a pressure difference to be achieved that is equal to that used in pressure conveying. During suction conveying, a negative pressure of at least 0.2 barg, in particular at least 0.3 barg, and in particular at least 0.4 barg, in particular at least 0.6 barg, and in particular at least 0.8 barg relative to atmospheric pressure is generated at the destination.

A humidity content of the plastic pellets ensures that after pneumatic conveying, the plastic pellets do not contain an inadvertently large quantity of liquid at the destination. The humidity content is defined as the ratio of the mass of the liquid added relative to the mass of the plastic pellets. The humidity content is at most 10%, in particular at most 5%, in particular at most 2.5%, in particular at most 1.5%, and in particular at most 0.5%. A humidity content of more than 2.5% is particularly advantageous when conveying HDPE pellets and/or PP pellets, the temperature of the pellets being in particular at least 60° C., in particular at least 70° C., in particular at least 80° C.

Using air as carrier gas allows the method to be implemented in an uncomplicated manner. Alternatively it is conceivable to use nitrogen as carrier gas.

A relative humidity of the carrier gas at the destination of between 60% and 200% ensures advantageous conveying conditions along the conveyor line. In particular, it is ensured that the carrier gas is oversaturated at least in sections of the conveyor line. It is advantageous if the relative humidity of the carrier gas at the destination is between 80% and 150%, and in particular between 90% and 100%. It is particularly advantageous if the carrier gas is completely saturated to a maximum extent at the destination, with the result that the effort required to separate humid carrier air is reduced.

Adding liquid via at least one humidification point arranged along the conveyor line between the feed point and the destination, wherein the humidification point is in particular arranged in the region of a pipe bend, in particular upstream of the pipe bend, permits a targeted humidification of the carrier gas in particular at specific points along the conveyor line.

An exemplary embodiment of the invention will hereinafter be explained in more detail by means of the drawing.

DESCRIPTION OF THE PREFERRED EMBODIMENT

Figure 1:
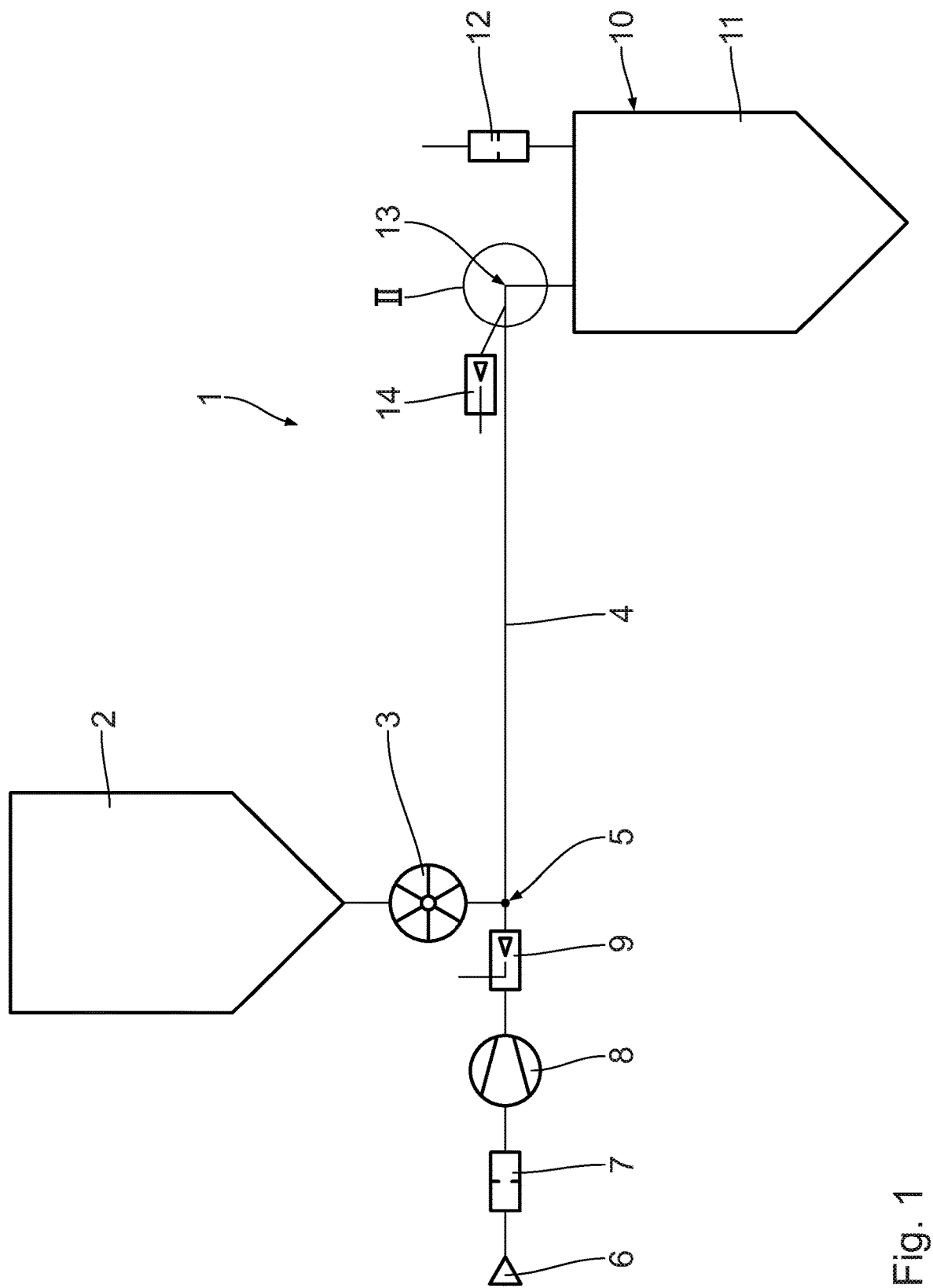
FIG. 1 shows a schematic view of an installation for implementing the method according to the invention.

An installation, represented in its entirety by reference numeral 1 in FIG. 1, is used for the pneumatic conveying of plastic pellets, the installation being suitable both for dense phase conveying and for dilute phase conveying.

The plastic pellets are stored in a container 2 and are fed to a conveyor line 4 at a feed point 5 by means of a feeding and dosing unit 3 configured as a rotary valve. It is conceivable as well to provide a plurality of containers 2 each connected to the conveyor line 4 via a separate feeding and dosing unit 3. The plastic pellets can also be produced in defined doses in an upstream process, for example in a pelletizer arranged downstream of an extruder.

At the feed point 5, a carrier gas in the form of carrier air is supplied to the plastic pellets fed to the conveyor line 4. The carrier air is provided from a compressed air source 6 via a filter 7 and a compressor 8. The carrier air is provided at the feed point 5 at an overpressure of at least 0.4 barg relative to atmospheric pressure. The installation 1 is configured for pressure conveying.

According to the exemplary embodiment shown, a humidifier 9 is arranged upstream of the feed point 5 to supply liquid to the carrier air. The liquid is water. When the liquid is added, this causes the carrier gas to be humidified in such a way as to be available in the form of a humid carrier gas to convey the plastic pellets along the conveyor line 4. The conveyor line 4 connects the feed point 5 to a destination 10, which—in the exemplary embodiment shown—comprises a receptacle 11. The receptacle 11 is a storage silo. The receptacle 11 is provided with a discharge air filter 12 arranged in particular at an upper front end thereof to allow discharge air to be discharged to the environment. It is conceivable as well to arrange a plurality of receptacles 11 at the destination 10, which may in particular each be configured differently.

The conveyor line 4 may have a sequential and/or branched configuration in such a way that a plurality of conveyor line sections are arranged and connected to each other in a parallel and/or daisy-chained configuration. A conveyor line formed of a plurality of conveyor line sections is in particular used to connect one or a plurality of containers 2 to one or a plurality of receptacles 11.

According to the exemplary embodiment shown, a pipe bend 13 is arranged along the conveyor line 4 that allows the transport flow of the plastic pellets and the carrier gas to be deflected. According to the exemplary embodiment shown, the pipe bend 13 permits a deflection by 90°. Other deflection angles, in particular in a range between 0° and 180°, are conceivable as well. It is conceivable as well to deflect the transport flow by means of a diverter valve.

Figure 2:
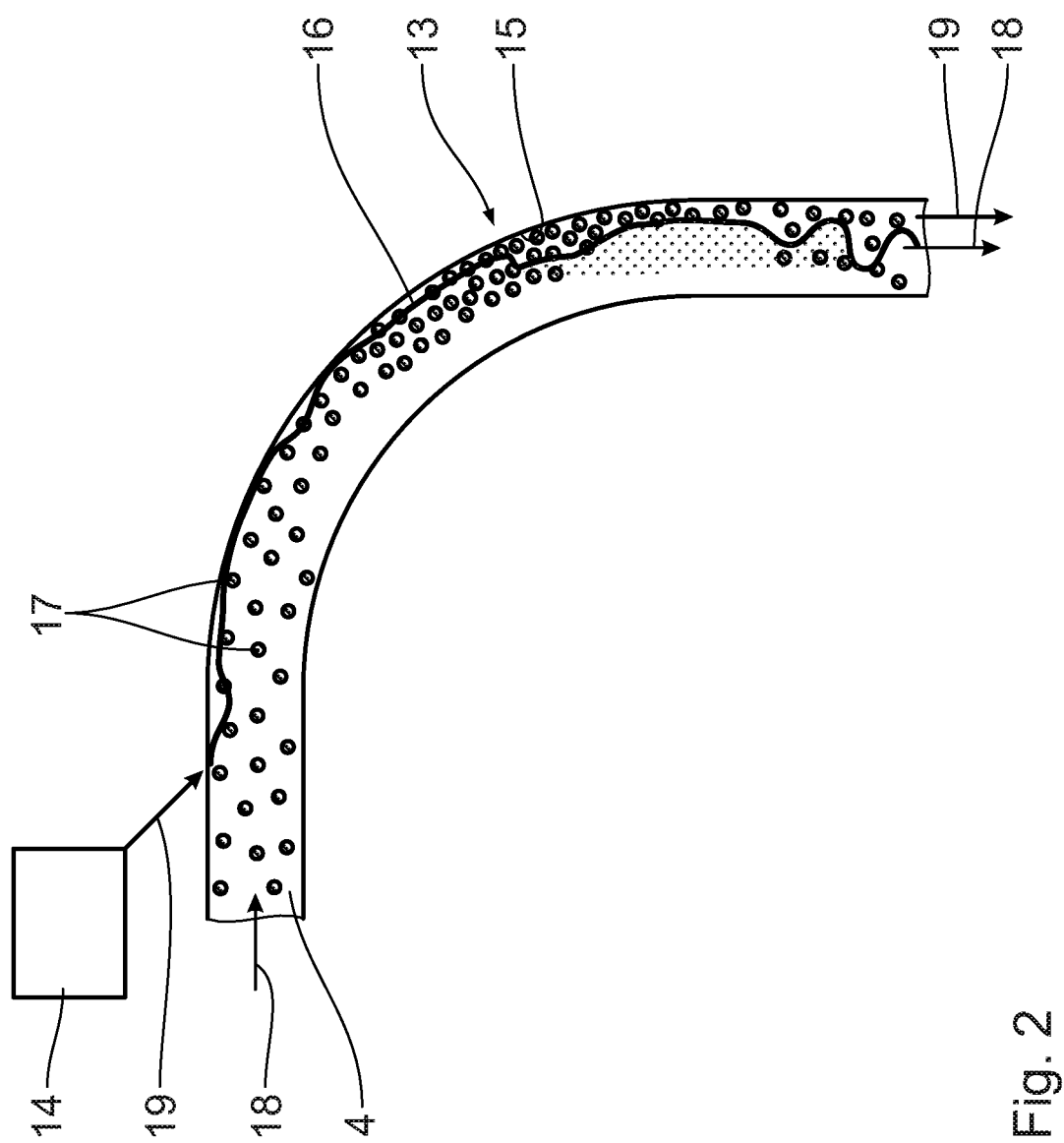
FIG. 2 shows an enlarged detail view of detail II in FIG. 1.

In the region of the pipe bend 13, in particular upstream of the pipe bend 13, another humidifier 14 is arranged that will hereinafter be explained in more detail by means of FIG. 2. It is advantageous if a plurality of humidifiers 9, 14, in particular more than two humidifiers, are arranged along the conveyor line 4. This allows liquid to be supplied at a plurality of positions in particular in a controlled manner and in particular in such a way as to meet the particular requirements, allowing the oversaturation of the entire quantity of humid carrier air to be reduced as a whole. The effort required to separate humidity and/or liquid at the destination 10 can therefore be reduced as well. At high conveying speeds occurring in particular during dilute phase conveying, the particles of the plastic pellets 17 are exposed to high frictional forces caused by the deflection of the transport flow in the pipe bend 13 and the resulting centrifugal forces. Due to these frictional forces and/or the contact of the plastic pellets 17 with the outer pipe wall 15 of the conveyor line 4 in the region of the pipe bend 13, the temperature of the wall increases, causing more dust and angel hair to develop. In order to prevent this, the additional humidifier is used to add liquid in the form of water upstream of the pipe bend 13. The water forms a lubricating film 16 on the inner surface of the outer wall 15. The lubricating film 16 reduces friction at the outer wall 15. The absolute reacceleration value is reduced. The abrasion of the plastic pellets 17 is reduced.

In addition thereto, an evaporation of the water added provides cooling to the surfaces of the plastic pellets 17 and to the inner wall of the conveyor line 4 in the region of the pipe bend 13, thus resulting in a reduced abrasion, too. The water vapor that develops assists the reacceleration of the plastic pellets 17 and in particular the conveying thereof by means of the humid carrier gas 18. The flow direction 18 of the carrier gas is also equal to the conveying direction of the plastic pellets 17. The flow direction of the water is represented by flow arrow 19.

A method for conveying plastic pellets will now be explained in more detail with reference to FIGS. 1 to 3. By means of the feeding and dosing unit, plastic pellets are fed from the container 2 to the conveyor line 4 via the feed point 5 thereof, and a carrier gas in the form of carrier air is supplied thereto. By means of the humidifier 9, water is added to the carrier air, causing the carrier gas to be humidified. The plastic pellets are conveyed along the conveyor line 4 by means of the humid carrier air. Due to the incomplete evaporation of the liquid when added to the carrier air, an additional evaporation of the liquid may occur along the conveyor line 4, with the result that the carrier air is oversaturated at least in sections of the conveyor line 4, in other words it has a relative humidity of more than 100%.

It was found according to the invention that the installation 1 is able to perform a pneumatic conveying in such a way that the Froude number is smaller than 45 at any position along the conveyor line, the loading is greater than 3, and the humidity content of the plastic pellets is at most 2.5%. According to the exemplary embodiment shown, the relative humidity of the carrier gas at the destination 10 is between 90% and 100%.

Surprisingly it was found that it is possible, when performing a method for conveying the plastic pellets, to reduce the carrier gas quantity if the operating parameters, in particular the Froude number, the loading, the feed pressure and/or the humidity content are selected appropriately. This is illustrated by the example shown in FIG. 3 representing a phase diagram for dilute phase conveying. In this phase diagram, the dependence of the feed pressure $p_F$ from the final speed v at a constant flow rate is represented by a continuous line. At its left-hand end, the curve 20 is bounded by the so-called choke line 22. If the carrier air quantity, and therefore the final speed v, are reduced further while maintaining a constant flow rate, this causes the conveyor line to become plugged. To the right of the choke line, the curve follows a curved line representing an exemplary flow rate with a feed pressure minimum $Min_{20}$. The curved curve section 20 is also referred to as phase curve.

The minimum $Min_{20}$ of the curve 20 defines a so-called operating point in the energetic optimum, in other words the energy required for conveying is reduced to a minimum.

Figure 3:
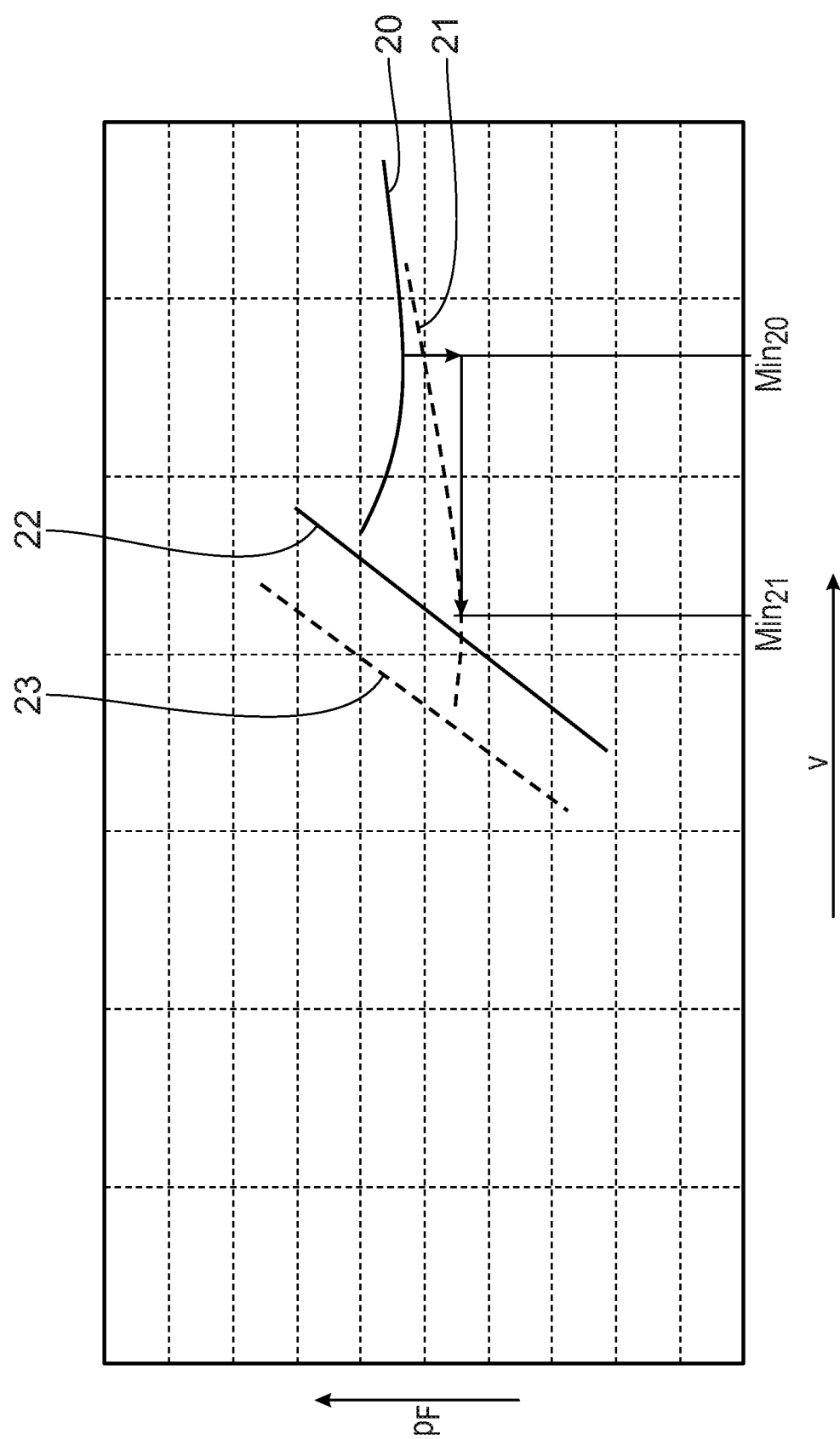
FIG. 3 shows a schematic view of a phase diagram for dilute phase conveying.

FIG. 3 shows another phase curve 21, shown by a dashed line, of a pneumatic conveying in accordance with the method according to the invention. Surprisingly, it was now found that when implementing the method according to the invention, it is possible to move the phase curve 21 of the method according to the invention to the left of the diagram, in other words towards reduced final speeds. This means that when implementing the method according to the invention, the choke line 23 and the pressure loss minimum $Min_{21}$, in other words the operating point, are moved towards reduced final speeds, with $Min_{21} < Min_{20}$ The method according to the invention can therefore be implemented in a particularly economic manner.

What is claimed is:

1. A method for pneumatically conveying plastic pellets, the method comprising the method steps:
    conveying plastic pellets via a carrier gas from a feed point to a destination through a conveyor line, the plastic pellets having a particle diameter of 2 mm to 5 mm, which is equivalent to that of a sphere having a same volume;
    adding a liquid to at least one of the carrier gas and the plastic pellets, wherein a quantity of the liquid added is such that during conveying, the carrier gas is oversaturated with the liquid at least in sections of the conveyor line;
    providing a Froude number defining conveying conditions in the conveyor line, the Froude number being less than 45 at any point along the conveyor line, wherein the liquid added evaporates only incompletely when being added, wherein a non-evaporated part of the liquid continues to evaporate when the liquid is conveyed along the conveyor line.

2. The method according to claim 1, wherein the liquid is water.

3. The method according to claim 2, wherein the liquid is demineralized water.

4. The method according to claim 1, wherein a ratio of a product mass flow to a mass flow of dry carrier gas in the conveyor line is greater than 3.

5. The method according to claim 1, further comprising a feed pressure for pneumatically conveying the plastic pellets along the conveyor line, wherein the feed pressure corresponds to a pressure difference between a feed point pressure and a destination pressure, the pressure difference amounting to at least 0.2 bar.

6. The method according to claim 5, further comprising a pressure conveying, wherein an overpressure relative to atmospheric pressure of at least 0.2 barg is at the feed point.

7. The method according to claim 5, further comprising a suction conveying, wherein a negative pressure relative to atmospheric pressure of at least 0.2 barg is at the destination.

8. A method for pneumatically conveying plastic pellets, the method comprising the method steps:
conveying plastic pellets via a carrier gas from a feed point to a destination through a conveyor line;
adding a liquid to at least one of the carrier gas and the plastic pellets, wherein a quantity of the liquid added is such that during conveying, the carrier gas is oversaturated with the liquid at least in sections of the conveyor line;
providing a Froude number defining conveying conditions in the conveyor line, the Froude number being less than 45 at any point along the conveyor line;
providing a humidity content of the plastic pellets of at most 10%, wherein the humidity content is defined as a ratio of a mass of the liquid added in relation to a mass of the plastic pellets.

9. The method according to claim 1, wherein the carrier gas used is one of air and nitrogen.

10. The method according to claim 1, wherein a relative humidity of the carrier gas at the destination is between 60% and 200%.

11. The method according to claim 1, further comprising an addition of liquid via at least one humidification point arranged along the conveyor line between the feed point and the destination.

12. The method according to claim 11, wherein the at least one humidification point is arranged in a region of a pipe bend.

13. The method according to claim 11, wherein the at least one humidification point is arranged upstream of the pipe bend.

14. The method according to claim 1, further comprising:
providing a humidity content of the plastic pellets of at most 10%, wherein the humidity content is defined as a ratio of a mass of the liquid added in relation to a mass of the plastic pellets.

15. The method according to claim 11, further comprising:
providing a humidifier, wherein the liquid is added to at least one of the carrier gas and the plastic pellets via the humidifier;
providing an additional humidifier, wherein additional liquid is added via the additional 5 humidifier, the additional liquid forming a lubricating film on an inner surface of an outer wall of the conveyor line.

16. The method according to claim 1, further comprising:
providing a humidifier, wherein the liquid is added to at least one of the carrier gas and the plastic pellets via the humidifier;
providing an additional humidifier, wherein additional liquid is added via the additional 5 humidifier, the additional liquid forming a lubricating film on an inner surface of an outer wall of the conveyor line.

* * * * *